Jan. 2, 1968   E. BLANK   3,361,930
DISCHARGE GAP MEANS INCLUDING A SPIRAL CAPACITOR
SURROUNDING OPPOSED ELECTRODES
Filed June 27, 1966   2 Sheets-Sheet 1

INVENTOR
EDWARD BLANK
BY
Wolf, Greenfield & Hieken
ATTORNEYS

Jan. 2, 1968   E. BLANK   3,361,930
DISCHARGE GAP MEANS INCLUDING A SPIRAL CAPACITOR
SURROUNDING OPPOSED ELECTRODES
Filed June 27, 1966   2 Sheets-Sheet 2

INVENTOR
EDWARD BLANK
BY *Wolf, Greenfield & Hieken*
ATTORNEYS

United States Patent Office 3,361,930
Patented Jan. 2, 1968

3,361,930
DISCHARGE GAP MEANS INCLUDING A
SPIRAL CAPACITOR SURROUNDING
OPPOSED ELECTRODES
Edward Blank, Sharon, Mass., assignor to Tobe Deutschmann Laboratories, Inc., Canton, Mass., a corporation of Massachusetts
Filed June 27, 1966, Ser. No. 560,604
9 Claims. (Cl. 315—59)

ABSTRACT OF THE DISCLOSURE

A hollow core supports a spiral capacitor and a pair of opposed electrodes inside the core spaced along its axis and in series with a high energy capacitor which establishes a high potential between the opposed electrode nearly, but not quite, large enough to break down the gap between the two opposed electrodes. The spiral capacitor is also charged to this high potential. When the input end of the spiral capacitor is short circuited by a gas discharge tube switch, a high energy impulse spirals inward toward the core axis in the spiral capacitor to produce a supplemental field that breaks down the gap between the two opposed electrodes to allow the high energy capacitor to discharge across this gap.

---

The present invention relates in general to switching and more particularly concerns novel apparatus for selectively initiating the discharge of a high energy short duration pulse through a load.

It is an important object of this invention to provide methods and means for rapidly and selectively initiating the discharge of a high energy impulse.

It is another object of the invention to achieve the preceding object with compact structure capable of storing energy at high potential on internally contained capacitive means that may be rapidly discharged entirely electrically.

According to the invention, means define a hollow core surrounding an axis on which a pair of axially displaced electrodes are located. First capacitive means surround the hollow core and have a first terminal connected to first conducting means and a second terminal connected to second conducting means insulatedly separated from the first. Second capacitive means have first and second insulatedly separated capacitively coupled terminals. Means are provided for connecting the first and second electrodes in series with the first and second terminals of the second capacitive means, typically through means including a load, so that the second capacitive means may discharge through a load when the gap between the first and second electrodes along the axis breaks down. To control this breakdown means define a supplementary electrode radially displaced from the first and second electrodes for coacting with one or both electrodes to establish a supplemental field to control breakdown between the first and second electrodes. Means are provided for applying a supplemental potential to the supplementary electrode to establish the field between the first and second electrodes sufficiently great to cause breakdown.

Numerous other features, objects and advantages of the invention will become apparent from the following specification when read in connection with the accompanying drawing in which.

Figure 1:
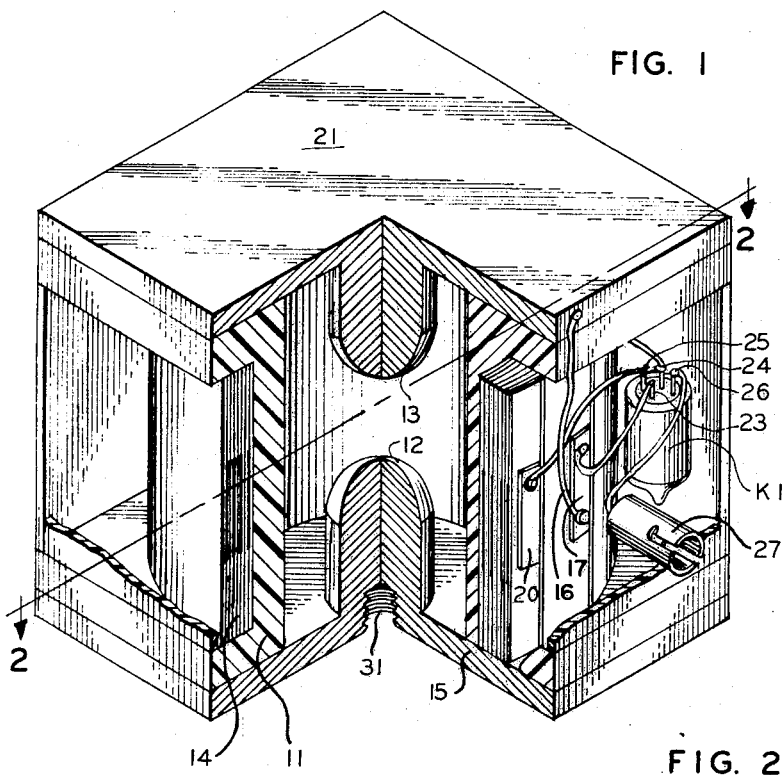
FIG. 1 is a perspective view of an embodiment of the invention with portions cut away to illustrate details of the structure.
Figure 2:
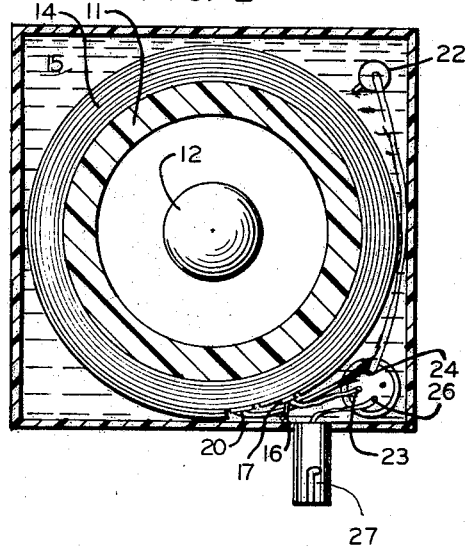
FIG. 2 is a view through section 2—2 of FIG. 1.

With reference now to the drawing and more particularly FIGS. 1 and 2 thereof, there are shown a perspective view of an embodiment of the invention with portions cut away to illustrate details of the structure in FIG. 1 and a view in FIG. 2 through section 2—2 of FIG. 1. Like reference symbols identify corresponding elements throughout the drawing. A hollow insulating spool 11 defines a core surrounding an axis on which a lower electrode 12 and upper electrode 13 are axially displaced. The spool 11 also functions as a support for the windings of capacitor 14 which may be generally of the spiral type described in copending application Ser. No. 444,160, filed Mar. 31, 1965, entitled High Voltage Apparatus. One foil from capacitor 14 may be connected to electrode 13 through upper base plate 21 connected by lead 16 to a first capacitor terminal 17. The other foil from capacitor 14 may be connected to lower electrode 12 through lower base plate 15 through a second terminal 20 and through resistor 22.

A Krystron K1 is shown with its cathode pin 23 connected to terminal 17 and its anode pin 24 connected by a resistor 22 to lower plate 15. The usual resistor from keep alive electrode pin 25 to anode 24, typically of the order of 100 megohms, is not shown so as not to obscure more important features of the specific embodiment. Grid pin 26 is connected to input connector 27 so that a pulse applied from an appropriate source to input connector 27 is sufficient to render Krystron K1 conductive and thereby effectively interconnect terminals 17 and 20 to send a pulse of energy in a spiral path about the axis of the spool and radially inward until this energy pulse reaches the inside foil of capacitor 14 to supplement the field between electrodes 12 and 13 to break down the gap therebetween and thereby discharge an external capacitor in series with a load and electrodes 12 and 13. This inside foil then comprises means defining a supplementary electrode.

The resistor 22 provides a high impedance path which constrains the external capacitor 35 to discharge through the load 34 in series with the gap across electrodes 12 and 13 while allowing the internal spiral capacitor 14 to charge from the same source 33 through resistor 32 that charges the large external storage capacitor 35 to be discharged through electrodes 12 and 13 upon application of a trigger signal to terminal 27.

Figure 3:
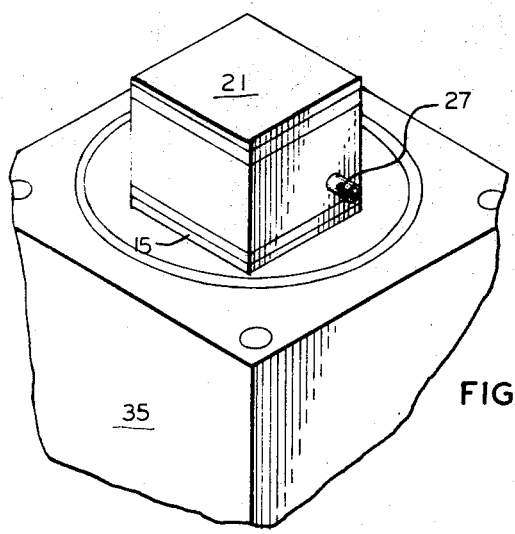
FIG. 3 is a view illustrating the switching apparatus of FIGS. 1 and 2 over a capacitor to be discharged therethrough.

Referring to FIG. 3, there is shown the apparatus of FIGS. 1 and 2 upon and in series with the large external storage capacitor 35. The tapped socket 31 (FIG. 1) in lower electrode 12 may be screwed over a threaded stud connected to an electrode of main capacitor 35.

Figure 4:
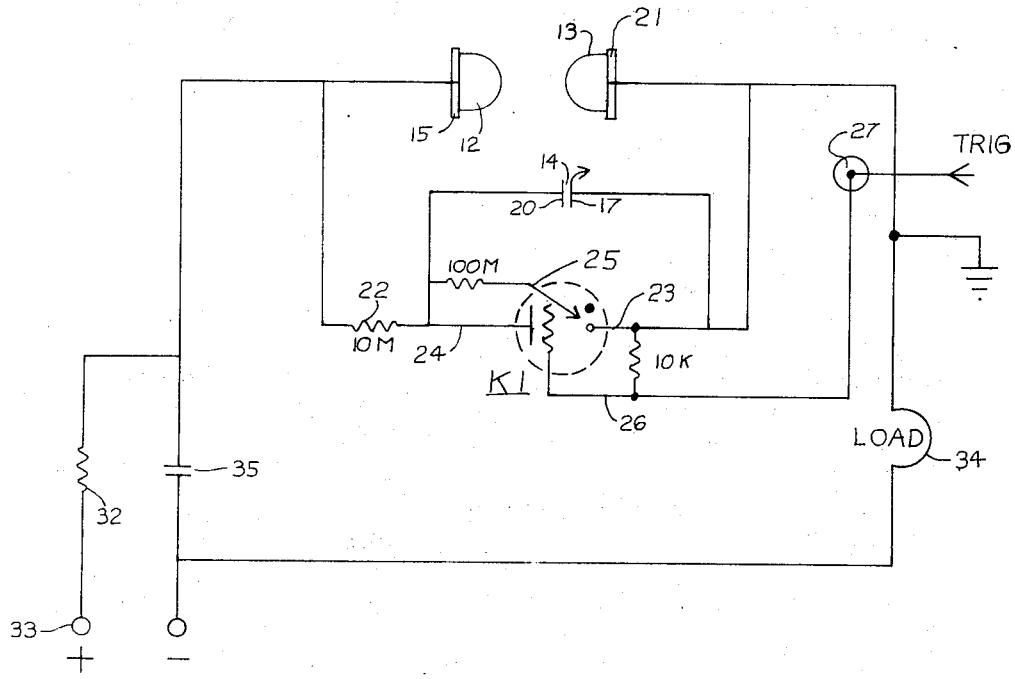
FIG. 4 is a schematic circuit diagram of a system according to the invention.

Referring to FIG. 4, there is shown a schematic circuit diagram of a system according to the invention. Both capacitors 35 and 14 are charged from the source 33 through resistor 32. The charge to capacitor 14 is also delivered through resistor 22. Now when a trigger pulse is applied to input terminal 27, Krystron K1 conducts to effectively interconnect terminals 17 and 20 of spiral capacitor 14. It is to be understood that other switching means may be used to effect this interconnection. As explained above, the spiral energy wave thus launched travels radially inward to distort the electric field between terminals 12 and 13, causing breakdown so that main capacitor 35 discharges through the gap between electrodes 12 and 13 and through the inductive load 34, this discharge occuring in a very short time.

The invention thus described has a number of advantages. A relatively compact package performs the switching function of the energy from the main capacitor while providing a convenient terminal to which the external load may be connected. The switching apparatus package according to the invention is passive and may receive its energy from the same source that charges the main capacitor. Switching is accomplished with relatively low power safely and easily.

An exemplary embodiment of the invention in which the Krystron tube K1 is an E. G. & G. type KN6B with capacitor 14 being a .05 microfarad spiral unit of ten turns with an inside radius of two inches and an outside radius of three inches and with electrodes 12 and 13 one inch in diameter made of brass, separated by one-quarter inch switched a 15 microfarad capacitor charged to 20,000 volts through an inductive load of .1 microhenry to produce an energy pulse of 2.5 microseconds' duration and 3,000 joules when triggered by an input step of 250 volts.

It is evident that those skilled in the art may now make numerous modifications of and departures from the specific embodiment described herein without departing from the inventive concepts. Consequently, the invention embraces not only each and every novel feature and novel combination of features present in or possessed by the apparatus and techniques herein disclosed but is to be construed as limited solely by the spirit and scope of the appended claims.

What is claimed is:
1. Switching apparatus comprising,
   first electrode means and second electrode means defining a gap therebetween for establishing a main electric field in said gap,
   supplemental electrode means adjacent to said gap for coacting with at least one of said first and second electrode means to comprise means for establishing a supplemental electric field in said gap,
   and means coupled to said supplemental electrode for providing a supplemental energy pulse to said supplemental electrode for establishing said supplemental electric field,
   said means coupled to said supplemental electrode means comprising first capacitive means having first and second insulatedly separated conducting foils surrounding said gap with a portion of one of said foils separated from said at least one electrode by said gap being said supplemental electrode.

2. Switching apparatus in accordance with claim 1 wherein said first capacitive means comprises a spiral capacitor with said first and second conducting foils being connected to first and second first capacitive means terminals respectively at respective points radially outward from said portion of one of said foils.
   and further comprising switching means for selectively interconnecting said first and second first capacitive means terminals for launching an energy pulse for delivery to said portion to establish said supplemental electric field for coacting with said main electric field for breaking down said gap.

3. Switching apparatus in accordance with claim 2 and further comprising second capacitive means connected to at least one of said first and second electrode means for coacting therewith to establish said main electric field.

4. Switching apparatus in accordance with claim 3 and further comprising,
   means for establishing a charge on said first capacitive means and said second capacitive means of sufficient magnitude so that the magnitude of the combination of said main electric field and said supplemental electric field is sufficient to break down said gap.

5. Switching apparatus in accordance with claim 4 and further comprising,
   load means in series with said second capacitive means, said first electrode means and said second electrode means for coacting therewith to establish said main electric field and for receiving an energy impulse provided by said second capacitive means when said gap breaks down.

6. Switching apparatus in accordance with claim 5 wherein said switching means comprises a gas discharge tube having at least an anode electrode, a cathode electrode, a control electrode and a keep alive electrode and further comprising,
   an anode resistor coupling said anode electrode to said first electrode means,
   a keep alive resistor coupling said keep alive electrode to said anode electrode,
   a control electrode resistor coupling said control electrode to said cathode electrode,
   and means for connecting said anode and cathode electrodes to said first capacitive means first and second terminals respectively.

7. Switching apparatus in accordance with claim 6 wherein said means for establishing a charge comprises a source of high potential direct coupled to said first capacitive means and said second capacitive means.

8. Switching apparatus in accordance with claim 7 and further comprising means presenting an impedance between said first and second electrode means and said first capacitive means that is high compared to the impedance of said gap when said gap is broken down to prevent energy from being delivered to said first capacitive means from said second capacitive means when said gap breaks down.

9. Switching apparatus in accordance with claim 1 and further comprising second capacitive means connected to at least one of said first and second electrode means for coacting therewith to establish said main electric field.

References Cited

UNITED STATES PATENTS

| 2,679,016 | 5/1954 | Johnson et al. | 313—189 X |
| 2,900,550 | 8/1959 | Fowler | 313—189 |
| 2,900,566 | 8/1959 | Fischer | 315—59 X |
| 2,923,852 | 2/1960 | Scott et al. | 313—59 |
| 2,939,049 | 5/1960 | Blackman | 315—241 X |
| 2,997,623 | 8/1961 | Westendorp | 315—241 X |

DAVID J. GALVIN, *Primary Examiner.*

JAMES W. LAWRENCE, *Examiner.*

C. CAMPBELL, JR., *Assistant Examiner.*